United States Patent Office 2,963,406
Patented Dec. 6, 1960

2,963,406

CONTROL OF YEAST FERMENTATION

Frede B. Strandskov, Verona, and John B. Bockelmann, Tenafly, N.J., assignors to The F. & M. Schaefer Brewing Co., Brooklyn, N.Y., a company of New York No Drawing. Filed Sept. 18, 1953, Ser. No. 381,108

4 Claims. (Cl. 195—123)

The present application is a continuation-in-part of Serial No. 336,873, filed February 13, 1953, now abandoned.

The invention relates to a method of eliminating gram negative bacterial infection and stimulating yeast fermentation by adding the antibiotic, polymyxin, to the yeast or fermentation medium at the start of the fermentation process. The fermentation of beer in an industrial installation, because of the size of the equipment and the volumes of materials used, is extremely vulnerable to bacterial infection. This fermentation in the brewery or distillery is usually carried on at a relatively low temperature, in the range of from 50–59° F. in order to avoid excess yeast activities of other types and particularly undesirable yeast and bacterial growth. In certain types of beer fermentation, temperatures up to 70° F. are used. When yeast cells are permitted to grow rapidly under these temperature conditions and to carry on the corresponding metabolism at a rapid rate, large quantities of by-products are released into the supporting medium which, in the case of beer, produces unfavorable flavors and odors. It is, therefore, important that the fermentation be carried on at as low a temperature as possible without increasing the time required to complete the fermentation within a practical limit.

Because of the low temperature at which the fermentation is usually carried out, the low pH value of the fermenting beer, the anaerobic conditions in the fermenter and the antiseptic value of the hop extracts in solution, only a few species of bacteria are able to grow in and survive during the fermentation process. One of the bacterial contaminants that is commonly encountered is a gram negative rod, *Flavobacterium proteus*, or its closely related gram negative species.

Organisms of this type are almost universally present in brewery beer fermentations, and when they are present in sufficiently high numbers, they produce a foreign odor in beer which resembles that of cooked parsnips. Shimwell, J. L., 1948, Wallerstein Lab. Comm. 11, 135. This is, of course, extremely undesirable.

The common method used in trying to control this type of infection is to treat the infected yeast, the pitching yeast, with a rather weak aqueous solution of an acid such as phosphoric or tartaric acid. This is done when the bacterial contamination reaches a level that is considered dangerous and this acid wash does effectively reduce the level of bacterial contamination but the infection is not completely eliminated. This treatment reduces the number of viable infecting bacteria but this reduction is usually only of the order of 90 percent. The remaining 10 percent of the bacterial infection begins to multiply again as soon as the treated yeast is used in a subsequent fermentation. Furthermore, this acid and washing treatment is very hazardous since the difference between the optimum pH level for bactericidal action and the pH level at which the yeast itself becomes adversely affected by the acid wash is only 0.3 of a pH unit. Thus, this acid washing treatment of the yeast provides at best, a yeast infected with up to 10% of the original number of viable bacteria, which bacteria are in an acidic environment favorable for their multiplication so as to negative the purification accomplished, particularly where the so-treated yeast may be stored prior to its use in fermentation, under conditions to change the pH and to favor the growth of the bacteria. This prior art treatment has required the brewer to maintain yeast propagating units which are kept under carefully controlled conditions to keep the yeast free from bacterial infection. This has been costly and burdensome. Frequently, despite the careful control which has been maintained, bacterial contamination of the yeast still occurs in inexplicable fashion, and the fermentation batch must be discarded.

The only method which existed heretofore for the complete elimination of the bacterial infection of brewer's or distiller's yeast is to discard the infected yeast and to replace it with a yeast that has been propagated in such a manner that it has been kept free of bacterial infection. Most breweries are not equipped to propagated yeast in this manner and to repeatedly purchase such pure yeast is, of course, quite costly.

It is manifest, therefore, that a simple and inexpensive method by which a yeast that is heavily infected with these bacteria could be purified would be of value to the brewing and distilling industry.

An object of the invention is to provide a method of stimulating the fermentation of beer by adding the antibiotic polymyxin in an amount from 0.005 gamma per milliliter up to about 20 gamma per milliliter and to thereby inactivate the growth of *Flavobacterium proteus* and related gram negative organisms in the fermentation medium.

A further object of the invention is to provide yeast for brewing operations containing the antibiotic polymyxin in an amount of at least 1.0 gamma per milliliter to inactivate *Flavobacterium proteus* and related gram negative organisms therein and to provide a fortified yeast whose rate of fermentation in brewery operations is increased without an increase in the rate of growth of the yeast in such fermentation.

Other and further objects of the invention will appear from the more detailed description set forth below, it being understood that such more detailed description is given by way of illustration and explanation only and not by way of limitation, since various changes therein may be made by those skilled in the art without departing from the scope and spirit of the present invention.

Although polymyxin has been reported by Stansly, P. G., R. G. Shepherd and H. J. White, 1947, in Bulletin of the Johns Hopkins Hospital 81, 43, as exhibiting a bacteriostatic and bactericidal activity specifically directed against gram negative bacteria, it was not apparent that this antibiotic could be useful in controlling and inhibiting the growth of the gram negative bacterial infection in a yeast fermentation. Further, since such atibiotics as Gliotoxin, Lupulon, Humulon, Pyocyanin and Streptothricin inhibit or inactivate the growth of yeast cells, it appeared not unlikely that the addition of the antibiotic polymyxin in the brew containing yeast might produce an unfavorable action upon the yeast. Each of the above indicated antibiotic agents has well demonstrated bactericidal and bacteriostatic activities but their application to eliminate undesirable flora and microorganisms is contra-indicated by virtue of the undesirable effect on the yeast cells.

Further, the use of an antibiotic to control microbial growth and flora must not introduce a dangerous reagent which would convert a potable beverage into a drug. From experience gained in the study of antibiotics, it has been considered that preparations containing more than 50 gms. of antibiotic per ton are to be classified as drugs. In view of the high dosages of certain of the antibiotics which are required for the inhibition of bacterial growth of the type present in the fermentation broth, it was surprising indeed that as little as 0.005 gamma per milliliter of polymyxin is effective to eliminate the rods and cocci in the fermenting beer. This concentration of polymyxin in the fermenting beer, 0.005 gamma per ml., amounts to 0.005 gram of antibiotic per 1,000,000 grams of fermenting beer as contrasted with the above maximum limitation which amounts to 50 grams of antibiotic per 1,000,000 grams of product. Thus, the concentration is $\frac{1}{10,000}$ of the maximum.

The economic consequences of this surprising discovery are obvious. In washing 1000 gr. of liquid yeast, about 2.6 gr. of tartaric acid are needed to obtain the necessary pH in accordance with the acid washing process of the prior art outlined above. Only 0.01 gr. of polymyxin per 1000 gr. of liquid yeast is required.

The polymyxin treatment has the advantage over tartaric or any other acid that no holding time would be required. One would merely add it to the yeast and the bactericidal action would continue in the fermenting beer.

A study of the bacteriostatic action of this antibiotic against the gram negative bacterium *Flavobacterium proteus* and brewers yeast or distillers yeast showed that on a yeast extract, glucose medium at 30° C., 50 gamma of polymyxin per milliliter would inhibit the growth of *Flavobacterium proteus* and the growth of brewer's yeast or distiller's yeast was not inhibited by 1,000 gamma of the antibiotic per milliliter.

This result was encouraging and the next step was to determine the level of polymyxin concentration in the fermenting beer required to inhibit the growth of the gram negative bacteria during a fermentation in which a heavily infected yeast was used.

We have found that concentrations of polymyxin as low as 0.005 gamma per milliliter of fermenting beer are not only bacteriostatic to these contaminating bacteria but also bactericidal since no viable bacteria could be found in the fermenting beer, nor in the resulting yeast crop. However, concentration below 20 gamma per milliliter do not affect the yeast adversely.

The ratio of the minimum concentration that inhibits yeast to the minimum bactericidal concentration is, therefore, 4,000 to 1.

The preferred method of adding polymyxin to the fermentation is to add it as a water solution to the pitching yeast and mixing it thoroughly with the least before the fermenter is pitched. The ratio of pitching yeast to the final volume of fermenting beer in the fermenter is approximately 1 to 200. Concentrations of polymyxin below 20 gamma per milliliter are not toxic to brewer's yeast or distiller's yeast. If then, for example, 10 gamma of polymyxin is added to the pitching yeast per milliliter of pitching yeast slurry, and this is diluted 200 times in the fermenter, the resulting concentration of polymyxin in the fermenting beer would be 0.05 gamma per milliliter which is an optimum concentration for brewing operations. As the minimum bactericidal concentration of polymyxin in fermenting beer is 0.005 gamma per milliliter, and the maximum concentration which does not affect the yeast adversely is 20 gamma per milliliter, any concentration of polymyxin between 1 and 4,000 gamma per milliliter in pitching yeast slurry would give an effective bactericidal concentration of the antibiotic against *Flavobacterium proteus* in the fermenting beer without any danger of affecting adversely the activities of the brewer's yeast or distiller's yeast. The usual filtration operation at the end of the beer making process eliminates all of the polymyxin antibiotic therefrom, as determined by the official method used in analyzing the polymyxin, "The Modified Benedict and Stadola Polymyxin Bio-assay."

The antibiotic, polymyxin, is bactericidal, under brewery beer fermentation conditions, to the gram negative bacteria, *Flavobacterium proteus*, that are so universally present as contaminants of brewer's yeast brewery fermenting beer. Any concentration of this antibiotic between 0.005 and 20 gamma per milliliter of fermenting beer will completely eliminate this bacterial infection during the first 24 hours of the fermentation and does not affect the yeast adversely.

While, as aforeindicated, the preferred method of adding the polymyxin is to thoroughly mix a water solution thereof with the pitching yeast slurry just prior to pitching, a water solution of the antibiotic can, however, also be added to the fermenting beer during the first 24 hours of the fermentation.

Polymyxin is effective in enhancing yeast growth, reducing the pH during fermentation, reducing the gravity of the fermentation medium and in controlling the microorganisms, rods and cocci in fermentations using *Saccharomyces cerevisiae* or Schizosaccharomyces in ale fermentations and in distillery fermentations. In the latter, the amount of polymyxin may be increased, particularly where infection by the micro-organisms is quite heavy and the recovery of the distilled product by the usual distilling technique leaves the antibiotic polymyxin in the still residue.

The invention may be more readily understood by illustration thereof in the following illustrative examples. In each of Examples 1–6 which are set forth below, yeast counts have been obtained in a control yeast culture and in a yeast culture containing polymyxin in the amounts indicated to be added. The pH is controlled within the indicated range. In Examples 1–6 the starting gravity is 11.7 degrees Plato. The fermentations including a control were run under the same conditions of initial pH, gravity, and yeast concentration.

EXAMPLE 1

*The control (beer fermentation)*

Three liters of fermenting beer from a plant fermenter which had been pitched during the preceding three hours with a yeast (*Saccharomyces carlsbergensis*) infected with approximately 200,000 cells of *Flavobacterium proteus* type bacterial rods per milliliter, were employed. The original gravity of this beer was 11.7 degrees Plato, the original pH was 5.1 and the original yeast count was six million cells per milliliter. The fermenter is suspended in a temperature controlled water bath and the temperature is adjusted each day to conform as nearly as possible to plant fermentation temperatures ranging from about 50° F. to 59° F. The fermentation of the beer, i.e. the filtered infusion of the starches, sugars, and hops after the heating of malted barley, is started at 50° F. and the temperature is permitted to rise but 2° per day, until on the fourth day a temperature of about 59° F. is attained, the heat of fermentation accounting for the temperature rise, and cooling being effected when necessary. The day after the fermenter is filled, and on each succeeding day for four days, aliquots for analysis are withdrawn from a standard depth of the fermenters with a pipette.

The results of these analyses on the second, third, fourth and fifth days after the fermentation is started were respectively: yeast count $\times 10^{-6}$ per milliliter equals 18.8, 26.0, 39.2 and 15.2; pH 4.69, 4.45, 4.21 and 4.10; degrees Plato 10.39, 8.00, 5.74 and 3.30.

EXAMPLE 2

In Example 2, the procedure and conditions are the same as in Example 1 with the exception that a water solution of polymyxin is added to give a final concentration of polymyxin in the fermenting beer of 0.003 gamma per milliliter.

The results of the analysis on the second, third, fourth and fifth days after the fermentation had been started were respectively: yeast count $\times 10^{-6}$ per milliliter equals 18.0, 29.3, 37.3 and 10.8; pH 4.71, 4.29, 4.16 and 4.00; degrees Plato 10.35, 7.61, 5.09 and 3.05.

EXAMPLE 3

In Example 3, the procedure and conditions are the same as in Example 1 with the exception that a water solution of polymyxin is added to give a final concentration of polymyxin in the fermenting beer of 0.024 gamma per milliliter.

The results of the analysis on the second, third, fourth and fifth days after the fermentation had been started were respectively: yeast count $\times 10^{-6}$ per milliliter equals 16.7, 30.8, 40.2 and 12.1; pH 4.68, 4.25, 4.09 and 4.00; degrees Plato 10.25, 7.46, 4.97 and 3.05.

EXAMPLE 4

In Example 4, the procedure and conditions are the same as in Example 1 with the exception that a water solution of polymyxin was added to give a final concentration of polymyxin in the fermenting beer of 0.200 gamma per milliliter.

The results of the analysis on the second, third, fourth and fifth days after the fermentation had been started were respectively: yeast count $\times 10^{-6}$ per milliliter equals 20.2, 30.5, 44.9 and 12.2; pH 4.62, 4.22, 4.03 and 3.98; degrees Plato 10.40, 7.65, 4.92 and 3.06.

EXAMPLE 5

In Example 5, the procedure and conditions are the same as in Example 1, with the exception that a water solution of polymyxin was added to give a final concentration of polymyxin in the fermenting beer of 1.600 gamma per milliliter.

The results of the analysis on the second, third, fourth and fifth days after the fermentation had been started were respectively: yeast count $\times 10^{-6}$ per milliliter equals 14.8, 30.0, 46.0 and 18.0; pH 4.67, 4.22, 4.02 and 3.98; degrees Plato 10.35, 7.65, 4.84 and 3.00.

EXAMPLE 6

In Example 6, the procedure and conditions are the same as in Example 1 with the exception that a water solution of polymyxin is added to give a final concentration of polymyxin in the fermenting beer of 13.0 gamma per milliliter.

The results of the analysis on the second, third, fourth and fifth days after the fermentation had been started were respectively: yeast count $\times 10^{-6}$ per milliliter equal 19.5, 29.7, 39.3 and 16.2; pH 4.65, 4.14, 4.02 and 3.98; degrees Plato 10.22, 7.28, 4.74 and 3.00.

EXAMPLE 7

In Example 7, the procedure and conditions are the same as in Example 1 with the exception that a water solution of polymyxin in the fermenting beer in the plant fermenter equipment of 0.05 gamma per milliliter.

Bacterial infection is completely eliminated. A considerable decrease in pH is noted starting the second day and degrees Plato likewise is decreased, indicating an acceleration of fermentation without any increase in the growth of yeast.

The bacterial infection is completely eliminated in Examples 3, 4, 5, 6 and 7.

The results of a study of the effect of polymyxin on beer fermentation are presented in Table I.

The yeast counts obtained in the control and the polymyxin containing fermenters, are recorded in the first section of the table and show that polymyxin does not affect yeast growth during a normal fermentation. The pH values of the fermenting beers during the four day period are recorded in the second section of the table. On the first day, there were no significant differences. On the third day, however, a considerable decrease in pH was noted in the fermenters that contained polymyxin over that obtained in the control. The decrease in pH of the fermenting beers correlates with the increase in polymyxin concentration.

A reference to pH reduction during a normal beer fermentation and its relationship to the increase in alcohol production can be found in a paper entitled: Experiments on Bottom Fermentation 1. Methodology, by Erik Helm and Birger Trolle. Wallerstein Laboratories Communications 10, 87–98 (1947).

Degrees Plato is equivalent to percentage sucrose in water solution and is also for all practical purposes equivalent to the percentage of extract in wort or beer. The relationship of degrees Plato to specific gravity is published in table form by the American Society of Brewing Chemists.

The above examples determine the concentrations of polymyxin required to inhibit the yeast and the infecting bacteria in fermenting beer at normal fermentation temperatures. The growth of the bacteria is inhibited by as little as 0.005 gamma per ml. and approximately 20 gamma per ml. is required to inhibit the yeast growth and fermentation. Filtered beer from these fermentations is free from the polymyxin, since none is detected by the standard test method.

TABLE I.—THE EFFECT OF THE ANTIBIOTIC POLYMYXIN ON BEER FERMENTATIONS

| Examples | Yeast Count × 10⁻⁶ | | | | | | pH | | | | | | Degrees Plato[1] | | | | | |
|---|---|---|---|---|---|---|---|---|---|---|---|---|---|---|---|---|---|---|
| | 1 | 2 | 3 | 4 | 5 | 6 | 1 | 2 | 3 | 4 | 5 | 6 | 1 | 2 | 3 | 4 | 5 | 6 |
| 1st Day | 18.8 | 18.0 | 16.7 | 20.2 | 14.8 | 19.5 | 4.69 | 4.71 | 4.68 | 4.62 | 4.67 | 4.65 | 10.39 | 10.35 | 10.25 | 10.40 | 10.35 | 10.22 |
| 2nd Day | 26.0 | 29.3 | 30.8 | 30.5 | 30.0 | 29.7 | 4.45 | 4.29 | 4.25 | 4.22 | 4.22 | 4.14 | 8.00 | 7.61 | 7.46 | 7.65 | 7.65 | 7.28 |
| 2nd Day | 39.2 | 37.3 | 40.2 | 44.9 | 46.0 | 39.3 | 4.21 | 4.16 | 4.09 | 4.03 | 4.02 | 4.02 | 5.74 | 5.09 | 4.97 | 4.92 | 4.84 | 4.74 |
| 4th Day | 15.3 | 10.8 | 12.1 | 12.2 | 18.0 | 16.2 | 4.10 | 4.00 | 4.00 | 3.98 | 3.98 | 3.98 | 3.30 | 3.05 | 3.05 | 3.06 | 3.00 | 3.00 |

[1] Original Gravity in all fermenters was 11.7.

Examples Polymyxin Additions:
1—Control—(none)
2—0.003 gamma/ml.
3—0.024 gamma/ml.
4—0.200 gamma/ml.
5—1.600 gamma/ml.
6—13.0 gamma/ml.

| Day | Bacterial Count (*Flavobacterium proteus*) | | | | | |
|---|---|---|---|---|---|---|
| | Example 1 | Example 2 | Example 3 | Example 4 | Example 5 | Example 6 |
| 1st | 203,000 | 197,000 | 0 | 0 | 0 | 0 |
| 3rd | 194,000 | 85,000 | 0 | 0 | 0 | 0 |

From Table I the yeast counts obtained in the control and the polymyxin containing fermenters are recorded in the first section of the table and show that these concentrations of polymyxin do not affect yeast growth. The pH values of the fermenting beers during the four day period are recorded in the second section of the table. On the first day, there were no significant differences. On the second day, however, a considerable decrease in pH was noted in the fermenters containing polymyxin over that obtained in the control. The extent of the decrease in pH thus determined correlates directly with concentrations of polymyxin between about .02 and about 0.2 gamma per ml. The difference continues to be in evidence through the third and fourth day but to a lesser extent as the end of the fermentation is approached.

A similar picture is obtained in the third section of Table I, where the gravities of the fermenting beers are recorded. End fermentations of the seven fermenters are determined and found to be 3.00 degrees Plato in each case. The fermenters that contained the highest concentrations of polymyxin had, therefore, reached end fermentation some time between the third and fourth day (this is actually between the fourth and fifth day after pitching) but the control had not reached end fermentation at the end of the fifth day.

Bacterial counts are made on the first and third days. The bacteria had been completely eliminated in the beers that contained 0.024 gamma per ml. or higher concentrations of polymyxin.

The data presented in Table I indicates that the antibiotic polymyxin does not stimulate yeast growth but that it does stimulate the fermentation process. This stimulation is not the result of the elimination of the bacterial contamination since an increased effect is obtained as the concentration of the antibiotic is increased over the minimum required to completely eliminate the bacterial growth, and as shown in Table I.

Thus, it is shown that polymyxin eliminates the infection of yeast by *Flavobacterium proteus* and stimulates yeast fermentation in the ferementation of beer. This stimulation of yeast fermentation is unexpectedly greater than that due to the elimination of bacterial infection, and is attained without any increase in the growth of the yeast cells.

The same effect on the stimulation of fermentation and the inhibition of *Flavobacterium proteus* is observed when mixtures of other antibiotics and polymyxin are added to the fermentation medium, either with the pitching yeast or in the medium itself. Polymyxin may be admixed with one or more of such antibiotics as bacitracin or terramycin and provide the new results of the invention, the improvement obtained being greater than that observed when these latter antibiotics are employed alone. Favorable results are also obtained in the admixture of polymyxin with streptomycin.

The filtration of the beer permits the separation of a solid residue containing the yeast and added antibiotic which has excellent value as an animal and poultry feed. The vegetable residue contains a growth promoting factor associated with the yeast and polymyxin and the vitamins associated with the yeast. The residue may be used as a feeding supplement with all vegetable protein such as those derived from soybean meal, peanut meal and the like.

EXAMPLE 8

The effect of the antibiotic polymyxin on an ale fermentation is determined by mixing 3.7 grams of polymyxin with 350 pounds of ale pitching yeast. This quantity of yeast is then pitched into 600 barrels [1] of wort and allowed to ferment. A control fermentation containing no polymyxin is run simultaneously. Analysis of the two fermenting ales were run at intervals and the results are presented in the following table.

EFFECT OF POLYMYXIN ON pH OF FERMENTING ALE

|  | pH of Fermenting Ale after— | | | | | End of 60 hr. of Fermentation |
|---|---|---|---|---|---|---|
|  | 0 hr. | 6 hr. | 12 hr. | 24 hr. | 36 hr. |  |
| polymyxin fermenter | 5.03 | 5.01 | 4.96 | 4.74 | 4.30 | 3.94 |
| control fermenter | 4.93 | 4.92 | 4.86 | 4.66 | 4.18 | 3.94 |

|  | Reduction in pH After— | | | | End of 60 hr. of Fermentation |
|---|---|---|---|---|---|
|  | 6 hr. | 12 hr. | 24 hr. | 36 hr. |  |
| polymyxin fermenter | 0.02 | 0.07 | 0.27 | 0.73 | 1.07 |
| control fermenter | 0.01 | 0.07 | 0.27 | 0.75 | 0.99 |

|  | Gravity (Degrees Plato) After— | | | | | | | End of Fermentation |
|---|---|---|---|---|---|---|---|---|
|  | 0 hr. | 6 hr. | 12 hr. | 24 hr. | 36 hr. | 48 hr. | 60 hr. |  |
| polymyxin fermenter | 12.40 | 12.39 | 12.30 | 11.78 | 9.80 | 5.92 | 3.71 | 2.30 |
| control fermenter | 12.30 | 12.30 | 12.17 | 11.31 | 9.40 | 5.10 | 3.52 | 2.20 |

|  | Reduction in Gravity (Degrees Plato) After— | | | | | | Total Decrease |
|---|---|---|---|---|---|---|---|
|  | 6 hr. | 12 hr. | 24 hr. | 36 hr. | 48 hr. | 60 hr. |  |
| polymyxin fermenter | 0.01 | 0.62 | 0.62 | 2.50 | 6.48 | 8.69 | 10.10 |
| control fermenter | 0.00 | 0.13 | 0.99 | 2.90 | 7.20 | 8.78 | 10.10 |

|  | Bacterial Count per ml. After— | | | | | Bacterial Count per per ml. of yeast crop |
|---|---|---|---|---|---|---|
|  | 0 hr. | 12 hr. | 24 hr. | 48 hr. | 60 hr. |  |
| polymyxin fermenter | 250 | 2,000 | 3,000 | 3,500 | 520 | 1,200 |
| control fermenter | 375 | 80,000 | 280,000 | 220,000 | 100,000 | 111,000 |

The above data show that polymyxin in this set of fermentations accelerates only slightly the fermentation as measured by reduction in pH and gravity of the fermenting ales. The reason may be that the ale fermentation is a very rapid fermentation as compared to beer fermentation with *S. carlsbergensis*. Also it is carried on at a much higher temperature. The starting temperature of the ale fermentation is 58° F. and it is permitted to go as high as 74° F. This compares with a starting temperature of 48° F. for beer fermentation with a maximum of 58° F. during the fermentation.

The polymyxin, however, effectively reduces the bacterial population of the fermenting ale and the resulting yeast crop.

The polymyxin has no adverse effect on yeast growth during the fermentation.

EXAMPLE 9

An industrial alcohol fermentation is carried out utilizing the yeast *Saccharomyces cerevisiae* or the yeast *Schizosaccharomyces*. Blackstrap from the sugar milling industry containing from about 40 to 55% of fermentable sugar or the conventional rye or Bourbon mash is used in preparing the fermentation beer by adjusting the fermentable sugar content to about 12 to 14%, add- ---
[1] Each barrel of wort contains 31 gallons.

ing the usual amounts of ammonium sulfate, soluble phosphates, and the like as a source of food for the yeast, and adjusting the pH from about 3.5 to about 4.7. The composition of the rye mash or Bourbon mash is as set forth at page 231 of Prescott and Dunn, "Industrial Microbiology," McGraw-Hill, 1949. The fermentation with the above yeasts is carried out at a temperature of about 70° F. to about 90° F. for 6 days. The temperature rises during the fermentation as is conventionally found, and the bacterial count per milliliter of yeast crop, starting with about 400 pounds of the yeast to about 16,000 gallons of the beer has a value of about 400,00 after 24 hours in a controlled fermentation under the same conditions whereas the addition of about 4.5 grams of polymyxin to 400 pounds of the yeast *Saccharomyces cerevisiae* reduces the bacterial count to about 3,800 per milliliter of yeast crop. The pH is reduced from a starting pH of about 4.7 to a pH of about 4.0 after 24 hours, and a final pH of about 3.8 is attained after 36 hours in both the control fermentation and the polymyxin fermentation but the gravity reduction is slightly greater with the polymyxin fermentation than in the control fermentation, particularly after 24 hours to indicate a perceptible synergistic effect of the polymyxin in the stimulation of the yeast growth.

It has been found that the conventional disinfectants such as ammonium bifluoride may be dispensed with by using polymyxin. The disadvantages incurred with the use of these conventional disinfectants are to be avoided.

The delayed action of the polymyxin in reducing the bacterial count is similar to that encountered in the fermentation of beer and of ale. The disappearance of bacteria which are occluded by or absorbed on the yeast after the induction period which lasts from 2 to 3 days provides a remarkably efficient control at the end of the fermentation where the control is really needed in order to eliminate undesirable micro-organisms.

Having thus disclosed the invention, what is claimed is:

1. A method of stimulating yeast fermentation comprising adding the antibiotic polymyxin to the fermentation medium in an amount of from about 0.005 gamma per milliliter up to about 20 gamma per milliliter whereby unfavorable flavors and odors are suppressed and the rate of fermentation is increased.

2. A method as in claim 1 wherein the polymyxin is added to the yeast in the form of an aqueous solution to give any concentration between 1 and 4000 gamma of polymyxin per milliliter of yeast slurry prior to the addition of the yeast to the fermentation medium.

3. A method of stimulating the yeast fermentation of beer and inactivating *Flavobacterium proteus* and related gram negative organisms in the fermentation medium in brewing operations comprising adding the antibiotic polymyxin to the beer fermentation medium in an amount of from about 0.005 gamma per milliliter up to about 20 gamma per milliliter whereby unfavorable flavors and odors are suppressed and the rate of fermentation is increased.

4. A method of stimulating the yeast fermentation of ale and inactivating *Flavobacterium proteus* and related gram negative organisms in the fermentation medium in brewing operations comprising adding the antibiotic polymyxin to the fermentation medium in an amount of from about 0.005 gamma per milliliter up to about 20 gamma per milliliter whereby unfavorable flavors and odors are suppressed and the rate of fermentation is increased.

References Cited in the file of this patent

UNITED STATES PATENTS 2,599,950  Stansly _____ June 10, 1952

FOREIGN PATENTS 905,075  France _____ Apr. 3, 1945

OTHER REFERENCES

Drug Trade News, Mfgr. Sec., November 14, 1949, page 64.

Gray et al.: "Antibiotics and the Treatment of Brewers' Yeast," Wallerstein Lab. Comm., vol. 9, No. 27, pages 81, 115, 116, 118–127.

Juillerat, Wallerstein Lab. Comm., vol. 11, No. 33, page 158.

Peppler: Poultry Science, July 1950, page 525.

Brande et al.: Antibiotics and Chemotherapy, vol. 3, No. 3, March 1953, pages 271–273.

Hasseltine: Abstract of Ser. No. 229,226, published September 29, 1953, 674 O.G. 1368.